United States Patent [19]
Van Der Burg

[11] Patent Number: 6,151,876
[45] Date of Patent: Nov. 28, 2000

[54] METHOD AND APPARATUS FOR SHAPING A PART OF A PLANT

[76] Inventor: William Van Der Burg, Pickéstraat 25B, NL-2201 EP Noordwijk, Netherlands

[21] Appl. No.: 09/240,631

[22] Filed: Feb. 1, 1999

[30] Foreign Application Priority Data

Jan. 30, 1998 [NL] Netherlands ............................. 1008163

[51] Int. Cl.⁷ ........................................................ A01G 3/00
[52] U.S. Cl. ........................................................ 56/234; 56/1
[58] Field of Search ............................. 56/235, 233, 230, 56/15.2, 234, 236, 255, 6; 30/379, 299, 379.5; 83/928; 47/4

[56] References Cited

U.S. PATENT DOCUMENTS

| | | | |
|---|---|---|---|
| 1,627,258 | 5/1927 | Sullivan | 56/237 |
| 3,496,709 | 2/1970 | Egbert et al. | 56/237 |
| 3,635,004 | 1/1972 | Webb et al. | 56/235 |
| 3,913,304 | 10/1975 | Jodoin | 56/235 |
| 4,382,332 | 5/1983 | Dominge | 30/379 |
| 4,383,401 | 5/1983 | Lessard et al. | 56/236 |
| 4,543,775 | 10/1985 | Horn et al. | 56/235 |
| 4,777,787 | 10/1988 | Warren . | |
| 4,970,791 | 11/1990 | Vergara | 30/216 |
| 5,020,309 | 6/1991 | Hopkins | 56/13.3 |

FOREIGN PATENT DOCUMENTS

| | | | |
|---|---|---|---|
| 170948 | 5/1906 | Germany | 56/233 |
| 2 155 357 | 5/1973 | Germany . | |
| 4110582 | 10/1992 | Germany | 56/233 |
| 44 09 126 | 6/1995 | Germany . | |
| 9301671 | 4/1994 | Netherlands . | |

Primary Examiner—David Bagnell
Assistant Examiner—Meredith C. Petravick
Attorney, Agent, or Firm—Sughrue, Mion, Zinn Macpeak & Seas, PLLC

[57] ABSTRACT

A method and apparatus for the shaping of a part of a plant. To this end, the plant and cutting device are rotated with respect to each other and excess material is removed. These cutting devices can be either moveable or fixed in relation to the surroundings. The point of contact of the cutting device and the plant lies, as far as possible, 'upstream', seen in the direction of rotation. The plant can then be potted and the pot can be rotated or, the plant can be stationary while the cutting device rotates with respect to the central axis of the plant.

13 Claims, 3 Drawing Sheets

METHOD AND APPARATUS FOR SHAPING A PART OF A PLANT

The present invention relates to a method according to the preamble of claim 1.

Such a method is known from DE-44 09 126 C1.

A large part of the retail price of cultivated trees such as a buxus, which are clipped into a particular shape such as a sphere, is the labor costs of the clipping/trimming. In DE-44 09 126, a structure is described wherein a pot plant, such as a buxus, is rotated and stationary hedge-shears are used to give the pot plant the desired rotationally symmetric shape. It emerged that, using this mechanized clipping system, the results, apart from not optimizing the shape, were unsatisfactory. This was particularly true of the so-called double clip or double cut. Due to the moving clipping or cutting elements, the leaves can be cut into without being cut through. Leaves which have been clipped or cut in this way quickly turn an unacceptable brown color. As the plants are usually sold soon after being shaped, this means that the plant is difficult to sell or that the price must be lowered.

An attempt has been made to solve the problem described above by using a large cutting element. This introduces the problem that it is extremely difficult to make a sphere with a proportionally small diameter.

It is an object of the invention to avoid these drawbacks. For the method as set forth, the object is met by the characterizing part of claim 1.

According to the invention, it is proposed that the cutting be carried out, as far as is possible, 'upstream', seen in the direction of rotation of the plant. Surprisingly, this has been found to significantly limit or even totally remove the problem of 'double cutting'. This means that the plants can be relatively finely clipped and an acceptably shaped plant can be produced. It is then possible to either move the plant in relation to the shears, which will usually be the case with pot plants, or, using a supporting frame which is placed around the plant in the soil, to rotate the cutting means around the plant, around the line of rotational symmetry.

This movement must be distinguished from the different possibilities of shaping the plant in question. It is possible, with one pair of cutters, when carrying out the mutual rotational movement of plant and cutters, to carry out a movement to achieve a particular form. This movement can be performed in any desired curve. In a simple embodiment, this is a circular path, so that a circular shape is given to the plant. In a further embodiment, a more complex path is used, controlled by a jig if necessary.

As described above, is it possible to shape the plant in question in several ways.

Another approach is the use of several pairs of shears, stationary during use, which together determine the shape of the plant.

The invention also relates to an apparatus for the shaping of a part of a potted plant according to claim 7. It is here also possible, in the case of a pot plant, to turn that pot plant with respect to the cutting means, which are stationary in this direction of rotation. For plants in the soil, it is possible to use a supporting frame which is moved around/over the plant, where the cutting means can make a rotation, with respect to the supporting frame, which corresponds to the desired central axis of the shape that is to be given to the plant. The method described above can be achieved using two embodiments. The first embodiment consists of a frame with a moveable, and more particularly, a hinged arm attachment, on which the preferably electrically operated cutting means are attached. In the second embodiment, the cutting means are fixed to an (auxiliary) frame and several cutting means are positioned around the circumference of the desired shape, which together, due to the rotation of the plant, realize the required shape.

It will be noticed that, with the subject invention, all rotationally symmetrical shapes can be realized, such as a sphere, cone and cylinder.

Vacuum extraction means should preferably be present to remove the clippings on the spot, so that contamination of the apparatus is avoided wherever possible. A clamping means can likewise be fitted for the plant pot, and rotation of the pot can occur both by the turning of the plateau on which this is mounted and by the separate rotating pressing means which grip the sides of the pot. Finally, supply and removal means for the pot can be present.

The apparatus described above can be constructed to be moveable. enabling it to be moved to the plant in question.

The invention will be elucidated below with respect to the embodiments shown in drawings. These show:

Figure 1:
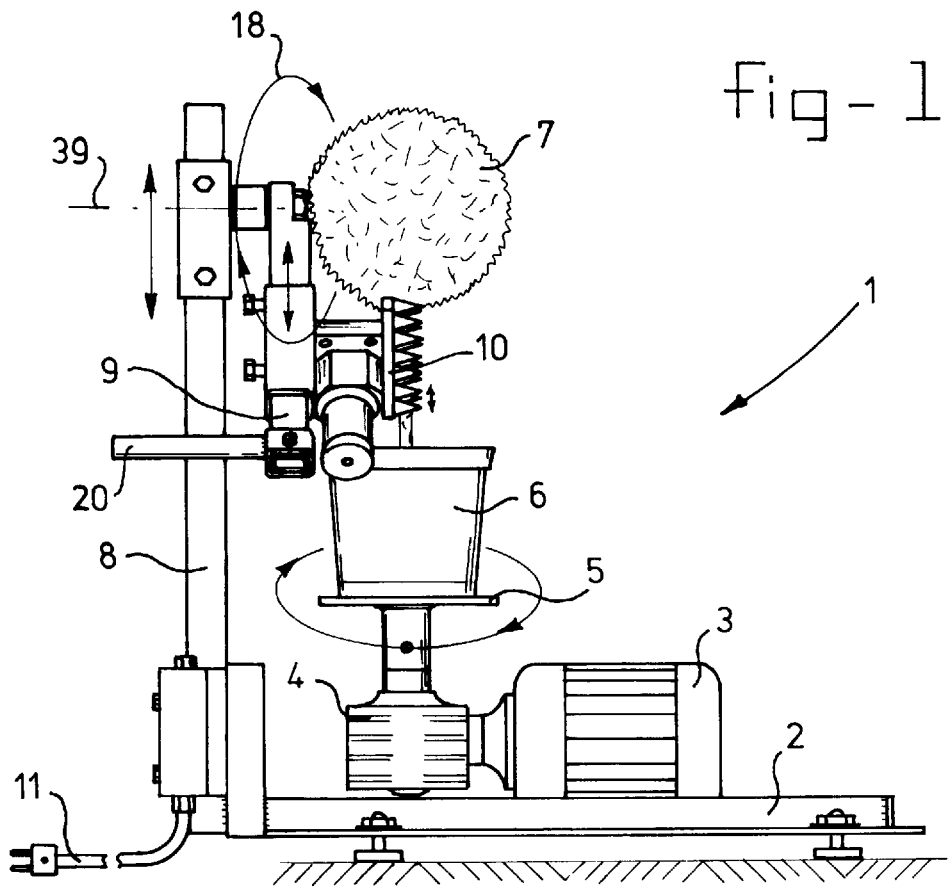
FIG. 1 shows a side view of a first embodiment according to the invention.

In FIG. 1, 1 shows the complete apparatus according to the invention. This consists of a frame 2 with a motor 3 fitted to it. The drive shaft of the motor is connected to a right angled transmission 4, which in turn is connected to a rotating table 5. A pot 6 containing a plant 7 can be placed on the table 5. A post 8 is joined to frame 2. A hinged arm 9 is mounted on this post 8. This arm 9 can hinge in the direction of arrow 18. A pair of shears 10 are attached to the end of the arm 9. These are provided with cutting blades which are not elaborated on further here. The shears 10 work electrically and the supply cable is indicated by 11.

Figure 2:
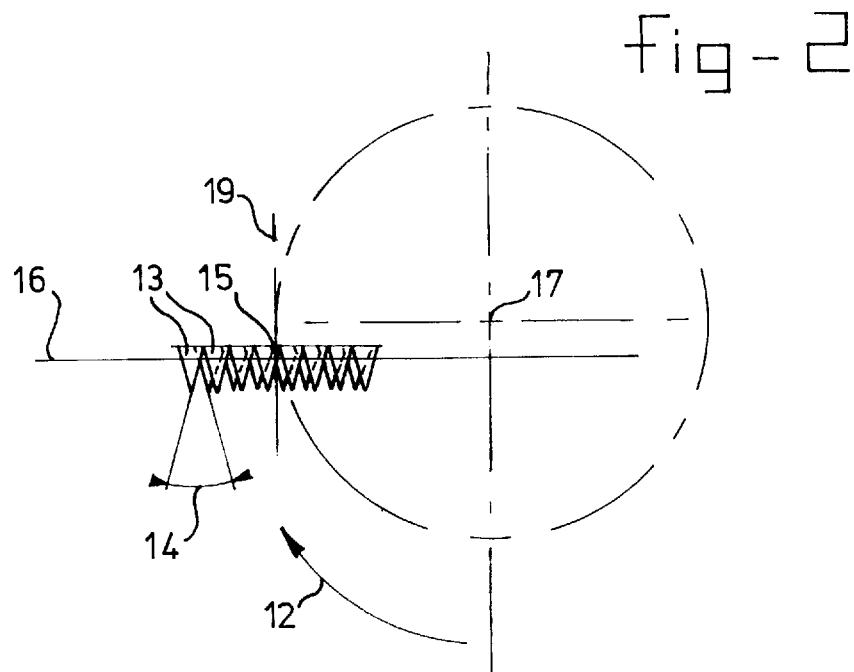
FIG. 2 shows a schematic top down view of the positioning of the shears with respect to the plant.

In FIG. 2, the positioning of the various blades 13 of the shears 13 with respect to the plant is shown, in a top down view. Between the blades of the shears is a cutting gap 14. The intersections of the cutting gap and the plant is indicated by 15. A line 16 is drawn between the two intersections 15. In the rotational direction 12 of the plant shown, line 16 lies in front of the center 17 of the circle.

In other words, the intersection, where the plant is gripped in the cutting gap 14, lies on a central axis 19. wherein the contact point of the central axis 19 with a circle with center 17 lies at a point above that intersection. This means that clipping takes place, as far as is possible, at a point above the intersection point, seen in the direction of rotation 12. This principle holds for all embodiments of the invention and is important in order to avoid double clipping.

In the embodiment described above, the shaping of a plant takes place by letting arm 9 make circular movements along the plant, as indicated by arrow 18, while the plant is being rotated on table 5. During this movement, the shears 10 are activated so that the spherical form shown in FIG. 1 is achieved. The process is then controlled by gripping handle 20 and rotating around the central axis 39. In place of the circular trajectory of arm 9, any other path can be followed by the blades of the shears. To this end, a jig could be used to determine the trajectory of the cutting means.

Figure 3:
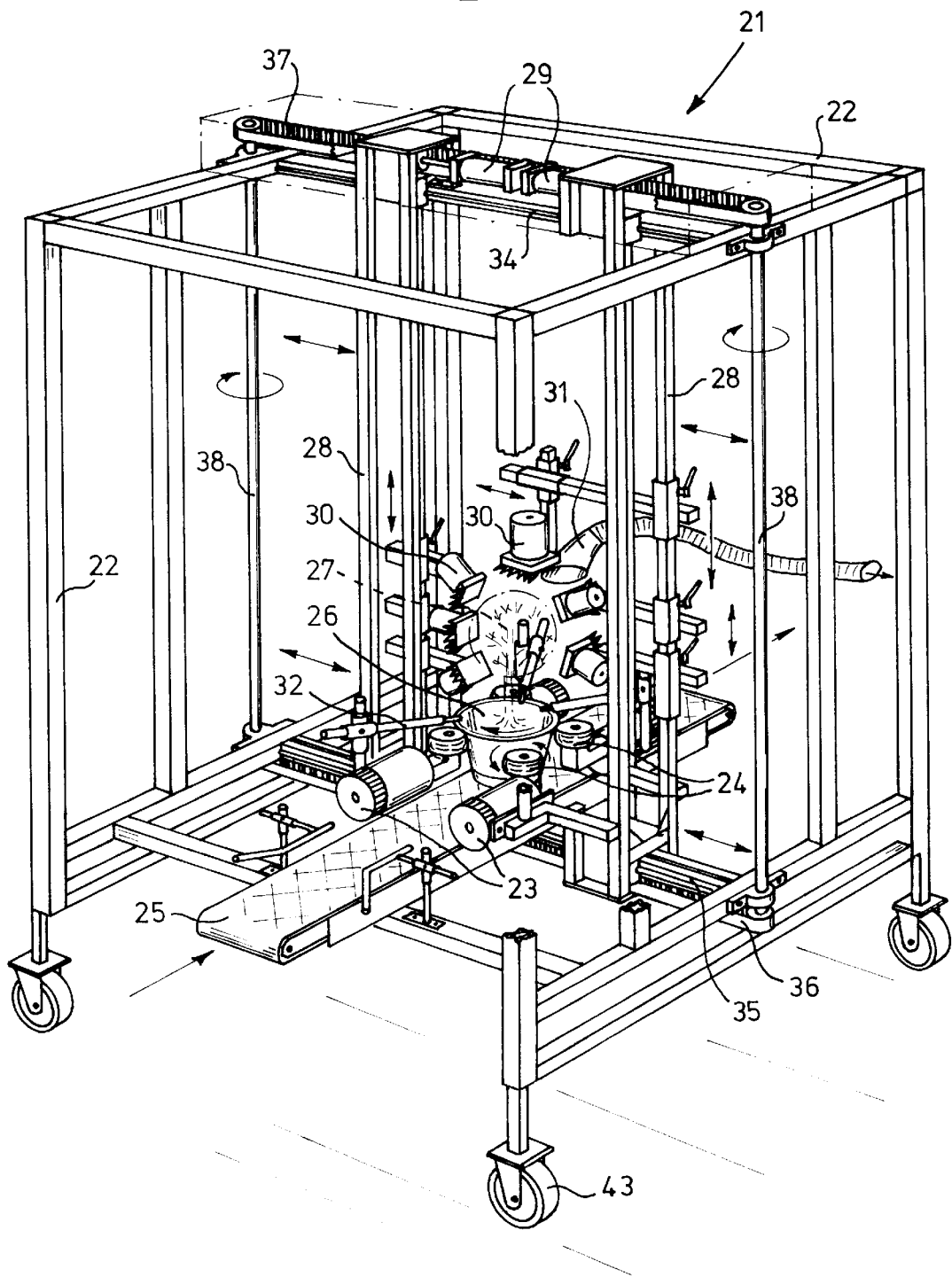
FIG. 3 shows a side view of a further embodiment according to the invention.
Figure 4:
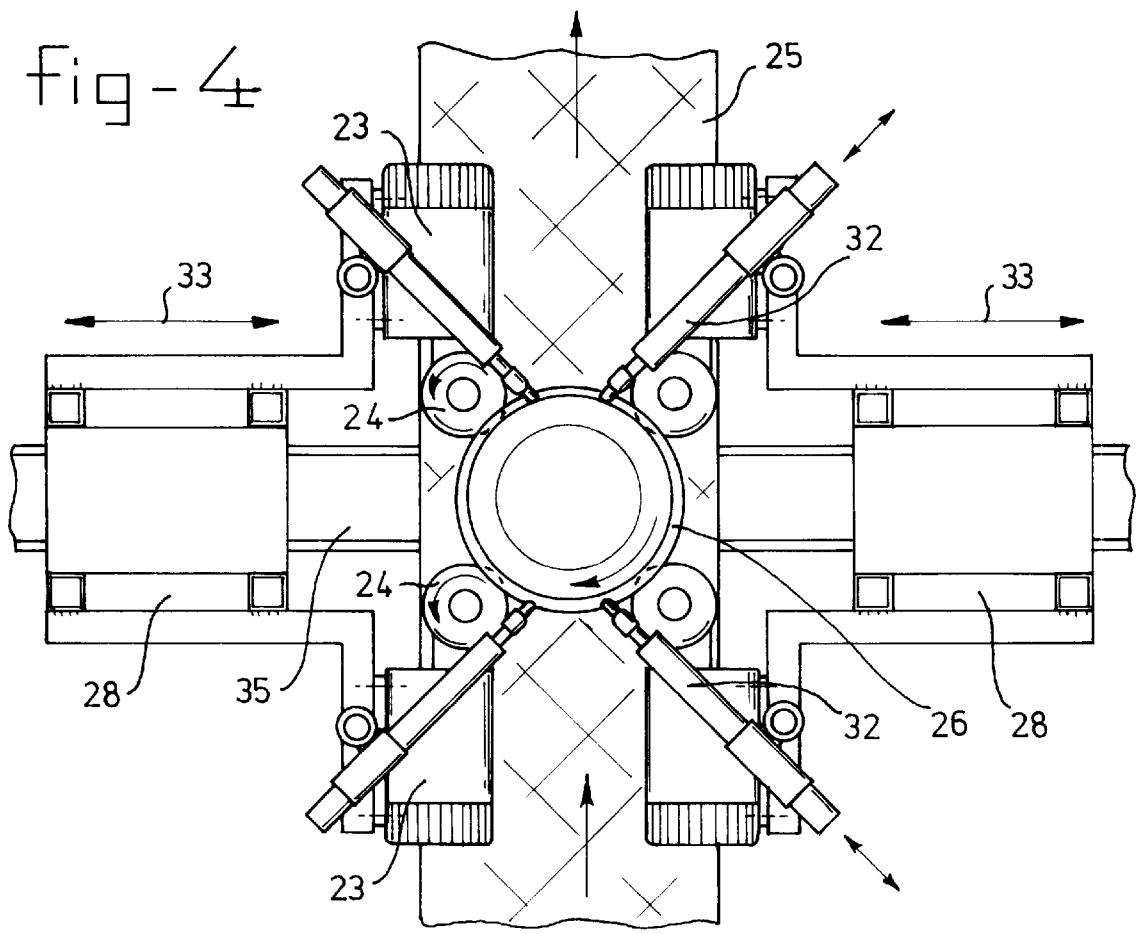
FIG. 4 shows a top down view of the lower part of the embodiment shown in FIG. 3.

In FIGS. 3 and 4, a further embodiment of the invention is shown. The complete apparatus is indicated by 21 and consists of a frame 22. Although not further elaborated on here, frame 22 can be closed off from the surrounding area by doors and such like, for safety reasons. Two auxiliary frames 28, which can be moved towards and away from each other as indicated in arrow 33 in FIG. 4, are mounted in frame 22.

The frame has wheels 43 to enable the apparatus to be moved.

Four motors 23 are present, operating four pressure-rollers 24. These motors 23 are fixed on the relevant auxiliary frames 28. In this context, 'stationary' should be understood as being stationary during use. Various possible adjustment mechanisms are present to adjust the apparatus to the particular plant and the clipped shape required.

A plant pot, indicated by 26, is gripped by the pressure-rollers 24 and is in this way rotated. The pot is supported by the conveyor belt 25, which also supplies and removes the pot and plant 27.

The auxiliary frames 28 can be moved backwards and forwards with the help of pneumatic piston cylinder structures 29. These pneumatic piston cylinder structures 29 grip onto a belt 37 which rotates rods 38, at the far ends of the apparatus, via a suitable gear wheel, causing belt 36 to move backwards and forwards. The auxiliary frames 28 move along the upper guidance rails 34 and the lower guidance rails 35 and, with the help of belts 36 and 37, are optimally positioned. The pressing force of the pressure-rollers 24 against the pot 26 can easily be controlled using the pneumatic piston cylinder structures 29. The pressing force depends on the dimensions of the pot and its stiffness. In addition, means for holding down 32, which grip the top edge of the pot 26, are mounted on the auxiliary frame.

Figure 5:
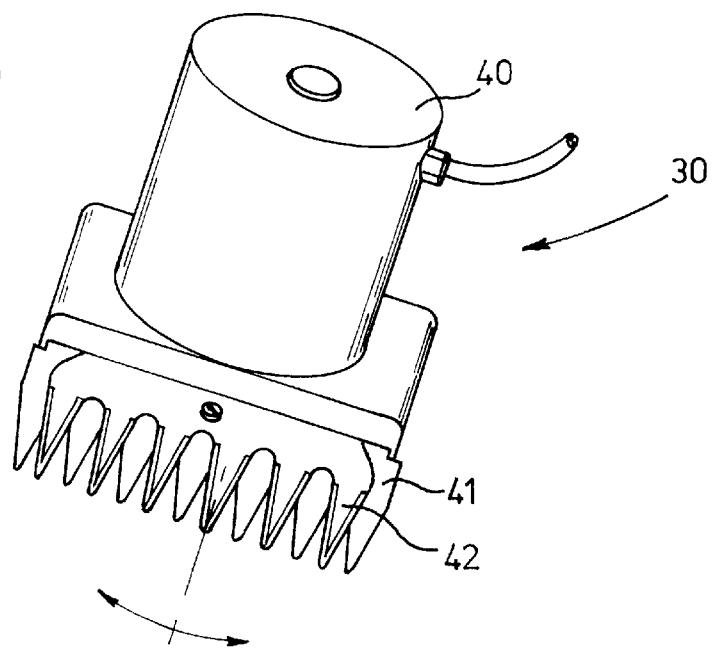
FIG. 5 shows the shears 30 shown in FIG. 3, in detail.

Stationary shears 30 are also mounted on the auxiliary frames. These consist of an electric motor 40 which is supplied with electricity by some means or other, as can be seen in FIG. 5. A first reciprocal blade 41 is present which moves in co-operation with a second reciprocal blade. Moreover, the cutting means are applied at various positions around the circumference and at different heights. Of importance is that the positioning always takes place as described using FIG. 2. In addition, vacuum extraction means 31 are present near the shears 30. These are only shown once. These can consist of a funnel with a pipe for the vacuuming of the plant clippings.

The apparatus described above, referring to FIGS. 3–5, functions as follows. In the starting position, the auxiliary frames 28 with the pressure-rollers and the shears 30 are moved away from each other, allowing free passage of the pots through the apparatus. These are placed on the conveyor belt 25 and moved to the center of the apparatus. The pot and or the plant is then detected and, regardless of whether the conveyor belt 25 stops or not, the auxiliary frames 28 are moved towards each other. The pressure-rollers 24 thus press the pot into a defined position.

The holding down means 32 then also move over the edge of the pot 26 so that it cannot tip over. The use of this sort of holding down means 32 depends on the weight of the pot and the circumference of the plant to be clipped.

Next, the pot is turned by the pressure-rollers 24. It will be understood that, although each of the pressure-rollers in the present embodiment is individually driven, one or more rollers can be embodied without such a drive. During the rotation, the shears 30 are powered simultaneously and the clipping of the plant 27 takes place. After one or two revolutions have taken place, the auxiliary frames are once more moved away from each other and the pot in question can be removed via the conveyor belt 25.

It has been found that, with the present construction, the handling time of, for example a buxus, can be reduced significantly. Where, for example, 3 minutes were needed for manual clipping, this can be limited to 10 seconds per plant while, by increasing the supply speed and the speed of rotation, the yield can be improved further.

For persons skilled in the art, it will be clear that further variants of the invention are possible within the scope of the present invention. It is possible to add a cutting-apparatus above the plant to be clipped, to remove the remaining 'sprigs'. Moreover, it will be clear that the control of the various parts should preferably be carried out electrically depending on the circumstances of operation.

It is clear that the description of the figures given above does not describe the embodiment where the plant is, for example, fixed in the soil, does definitely not rotate and where the cutting means make a rotating movement around the central axis of the required rotationally symmetrical form of the plant.

What is claimed is:

1. A method of rotating and symmetrically shaping a part of a potted plant by mechanical clipping with a cutting device having cutting blades with a cutting gap formed between adjacent cutting blades, including rotating said potted plant with respect to said cutting device which is performing a cutting operation on said plant, positioning the cutting device along a rotational axis of the potted plant such that the cutting gap lies at a point upstream from a point of contact of a central axis passing through the cutting gap in a direction parallel to a top portion of the cutting blades, so that a line drawn perpendicular to a mid-point of the central axis is tangent to a circle defined by the potted plant, and a center of said circle coincides with the rotational axis of said potted plant and said cutting device, and wherein said cutting means comprise various cutting means, each of said cutting device being arranged with a different angle relative to said rotational axis.

2. The method according to claim 1, wherein the cutting device move along a curve with respect to said potted plant.

3. The method according to claim 2, wherein the curve comprises a part of a circle trajectory.

4. The method according to claim 1, wherein the plant is a plant fixed in soil and wherein the cutting device rotate around the plant.

5. An apparatus for shaping a part of an accommodated plant, comprising:

clippers having cutting blades with a cutting gap formed between adjacent cutting blades;

a frame having at least two clippers, which are fixed during use, mounted at different angular positions with respect to the rotational axis; and means for rotating the plant with respect to said clippers, wherein said clippers have at least two cutting gaps which are provided such that a line through effective clipping points of each of said two cutting gaps, along a direction of rotation of the plant, lies in front of a center of the rotational axis of the plant with respect to said clippers.

6. The apparatus according to claim 5, further comprising a frame with a mounted moveable arm which is moveable in a height direction of the plant to be clipped, wherein said cutting means are electrically operated.

7. The apparatus according to claim 5 for use with a potted plant, having means for rotating the potted plant and wherein said cutting means are stationary such that they do not rotate with respect to the rotational axis of the potted plant.

8. The apparatus according to claim 7, wherein said means for rotating the pot comprise pressure-rollers.

9. The apparatus according to claim 7, further comprising means for holding down said pot.

10. The apparatus according to claim 7, further comprising supply/removal means for a plant pot.

11. The apparatus according to claim 5, further comprising a supporting frame placed around the plant, wherein said cutting means are mounted to rotate along the rotational axis with respect to that supporting frame.

12. The apparatus according to claim 5, further comprising a vacuum extraction means for removing plant clippings.

13. The apparatus according to claim 5, further comprising means for moving said apparatus.

* * * * *